United States Patent [19]

Shirakawa et al.

[11] Patent Number: 5,145,806
[45] Date of Patent: Sep. 8, 1992

[54] FILTER FOR METAL HOT MELT

[75] Inventors: Hiroshi Shirakawa, Kagamihara; Osamu Yamakawa, Kani, both of Japan

[73] Assignees: NGK Insulators, Ltd.; NGK Adrec Co., Ltd., both of Japan

[21] Appl. No.: 666,080

[22] Filed: Mar. 7, 1991

[30] Foreign Application Priority Data

Mar. 30, 1990 [JP] Japan .................................. 2-83249

[51] Int. Cl.⁵ .......................... C04B 38/00; C21B 3/04
[52] U.S. Cl. .......................................... 501/80; 501/94; 501/123; 501/127; 501/128; 210/510.1; 266/227
[58] Field of Search ................. 501/80, 128, 123, 127, 501/94; 210/510.1; 55/523; 266/227

[56] References Cited

U.S. PATENT DOCUMENTS

| 3,524,548 | 8/1970 | McDonald et al. | 210/153 |
| 4,258,099 | 3/1981 | Narumiya | 210/510.1 |
| 4,343,704 | 8/1982 | Brockmeyer | 210/510.1 |

Primary Examiner—Mark L. Bell
Assistant Examiner—Deborah Jones
Attorney, Agent, or Firm—Parkhurst, Wendel & Rossi

[57] ABSTRACT

A porous filter for metal hot melt comprises ceramic aggregate particles bound by an inorganic binder. The aggregate particles contain not less than 50 wt % of particles with a shape factor in the range of 100 to 130 and the binder has needle-shaped crystals deposited on the surface thereof. By employing this filter, debris catching ability and initial impregnation of metal hot melt are highly improved.

4 Claims, 1 Drawing Sheet

FILTER FOR METAL HOT MELT

BACKGROUND OF THE INVENTION

1. Field of the Invention

The present invention relates to a filter for metal hot melt which is suitable for filtrating impurities (debris) contained in metal hot melt, and particularly in aluminum hot melt.

2. Description of the Related Art

Sheet metal or foil has been previously produced by rolling an ingot into which metal hot melt is cast. If the ingot is contaminated by solid impurities such as minute fragments of metal oxides or refractories contained in metal hot melt, pinholes or surface defects may arise in the sheet or foil during the rolling of the ingot when manufacturing such products. The prevention of these defects requires the removal of solid impurities contained in the hot melt. Accordingly, conventional means such as glass cloth, alumina balls, ceramic form, and the like have been used as filters for filtrating hot melt.

However, although glass cloth is inexpensive, it tends to be readily choked up, and alumina balls have inaccurate filterability since impurities which were once caught in the filter readily flowed out. Ceramic form has pores with a large diameter, whereby minute impurities are insufficiently filtrated.

Therefore, a cylindrical porous filter such as disclosed in Japanese Patent Publication No. 52-22327 has been used lately. The filter has numerous minute consecutive pores formed between aggregate particles of silicon carbide, silicon nitride, alumina, or like materials which are bound to each other by an inorganic binder. This filter is superior to the above-mentioned filters in filtrating: clogging is prevented for a long period; impurities which are once caught can not flow out; a suitable pore diameter can be set to filtrate minute impurities.

However, nowadays there is an increasing need for a more effective filter for metal hot melt in the industry that manufactures substrates for memory disks used for computer memory. In such fields, even a cylindrical filter mentioned above does not have stable filterability due to its inconsistent quality and changes of the hot melt filtering conditions. Therefore, its reliability for catching impurities (debris) is not sufficient.

SUMMARY OF THE INVENTION

Accordingly, the object of the present invention is to provide a filter for metal hot melt which effectively catches minute impurities and improves initial impregnation (surface wettability) with hot melt. A filter for metal hot melt comprises ceramic aggregate particles bound by an inorganic binder, the aggregate particles containing not less than 50 wt % of particles with a shape factor in the range of 100 to 300 and the binder having needle-shaped crystals deposited on the surface thereof.

The present invention has features which use aggregate particles containing not less than 50% by weight of generally spherical particles with a shape factor in the range of 100 to 130, and which employ a binder having needle-shaped crystals deposited on the surface thereof.

By the combinative use of specified aggregate particles and binder, initial impregnation with metal hot melt (so-called wettability) can be improved and the catching ability of minute debris can also be increased.

The filtering mechanism of this invention is explained as below.

There are two kinds of filtering mechanisms: surface filtering and interior filtering. As schematically illustrated in FIG. 1, surface filtering is a mechanism in which solid impurities $1a$ are caught on the surface of the filter since impurities $1a$ are larger than the diameter of filtering path 2. Accordingly, surface filtering catches the larger solid impurities $1a$, while interior filtering catches solid impurities $1b$ of smaller size than the diameter of filtering path 2. These smaller size impurities $1b$ flow into the path 2 and are adsorbed on the surface of inorganic binder 3 or caught at uneven surface thereof. It effectively filters smaller solid impurities $1b$. The inorganic binder 3 is not only present between aggregate particles 4, but also widespread to cover the surface of aggregate particles 4, thereby covering the entire interior surface of filtering path 2.

Accordingly, even solid impurities $1b$ of smaller size than the diameter of filtering path 2 could be removed by said interior filtering, the size of the solid impurities to be filtered is not only determined by the diameter of filtering path 2 but is also affected by the size of the surface area and the surface condition of inorganic binder 3 and by the length of the filtering path 2.

In conventional filters, $Al_2O_3.B_2O_3.SiO_2.MgO.CaO$-based glass is employed as an inorganic binder. The surface of those binders is smooth: its surface area is relatively small; the uneven portion is small; Therefore, the conventional filter of interior filtering mechanism can not effectively filtrate minute impurities.

On the other hand, the inorganic binder in the present invention is crystallized thereby markedly increasing its surface area and providing a complex and uneven surface condition. Therefore, even the minute impurities which were once flowed into the filtering path can be adsorbed on the surface of the inorganic binder and caught on its uneven parts. Thus inferior filtering is activated and large quantities of minute impurities can be caught. Accordingly, this invention greatly improves the removal rate of minute impurities. Furthermore, the inorganic binder is crystallized in the shape of needles, whereby the tip of the crystal is pointed and readily catches the solid impurities.

Minerals to form needle-shaped crystals are mullite ($3Al_2O_3.2SiO_2$), willastonite ($CaO.SiO_2$), willemite ($2ZnO.SiO_2$), gahnite ($ZnO.Al_2O_3$) and aluminum borate ($9Al_2O_3.2B_2O_3$) and the like. The selection of the minerals for a binder requires reactivity and wettability with metal hot melt to be filtered. For instance, mullite ($3Al_2O_3.2SiO_2$) and aluminum borate ($9Al_2O_3.2B_2O_3$) which are excellent in anticorrosion but have low wettability, are suitable for filter for aluminum hot melt.

Aggregate particles in the present invention are confined to such kinds of particles that do not react with hot melt and have an adequate particle size and are also readily obtainable. These conditions are satisfied with ceramic aggregate particles such as alumina, silicon carbide, silicon nitride and zirconia. Average diameters of those aggregate particles to be employed are normally approximately 0.3 to 3.0 mm.

It is important in the present invention that aggregate particles selected contain not less than 50 wt % of particles whose shape factors (later determined) are within the range of 100 to 130.

Specifically, the shape factor (SF) is represented by the following equations.

$$SF = (SF_1 + SF_2 + SF_3)/3$$

Where
$SF_1 = (\pi/4) \times (M^2/A) \times 100$
$SF_2 = (1/4\pi) \times (P^2/A) \times 100$
$SF_3 = (M/B) \times 100$ In these equations, as illustrated in FIG. 2, M represents the maximum diameter of an aggregate particle, B represents the diameter perpendicular to the maximum diameter, A represents the projection area and P represents the circumference.

In case of the particle which is completely spherical, the shape factor is 100.

When aggregate particles contain not less than 50 wt % of particles with such a shape factor (i.e., abundant in spherical aggregates) in the present invention, porous body with an uniform pore diameter can be obtained, and accordingly not only the capture of impurities by filter is made more accurate but also initial impregnation with metal hot melt (so-called wettability) is increased.

By employing such specified aggregate particles and inorganic binders, a filter having a distribution of pores uniform in diameter is obtained; further, the binders can readily catch solid impurities because of their needle-shaped crystals. Therefore, highly efficient filtering of metal hot melt is attained.

If aggregate particles with particle size in the range of ±50% of 50% average diameter are employed in the present invention, it would be preferable because a filter having a distribution of pores more uniform in diameter is obtained.

A mixing ratio of such specified aggregate particles and binder is usually 4 to 20 parts by weight of inorganic binder to 100 parts by weight of aggregate particles.

As mentioned above, in order to produce the porous filter of this invention, it is necessary for the inorganic binders binding specified aggregate particles to have needle-shaped crystals deposited on the surface. Generating conditions to deposit needle-shaped crystals are illustrated below, using examples of aluminum borate and mullite.

Generating Conditions of Needle-Shaped Crystal of Aluminum Borate

Through a variety of tests, following conditions were found to be preferable: inorganic binder is composed of 15 to 80 wt % of $B_2O_3$, 2 to 60 wt % of $Al_2O_3$, 0 to 30 wt % of CaO and 5 to 50 wt % of MgO; for sintering the inorganic binder is heated to 1200°–1400° C., leading to melting state, and then is gradually cooled down to 800° C. at cooling speed of 30°–70° C. per hour. Crystallization has almost completed before reaching 800° C. and hence the cooling condition at temperatures under 800° C. is not specified.

Generating Conditions Needle-Shaped Crystal of Mullite

As the result of various tests, it has been confirmed that inorganic binders composed of 70–80 wt % of $Al_2O_3$ and 20–30 wt % of $SiO_2$, for example, a mixture of alumina and New Zealand kaolin or andalusite ($Al_2O_3.SiO_2$) can be employed.

It has been also confirmed that when suitable mineralizer such as $CaF_2$ or $B_2O_3$ is added to the inorganic binder, crystallization can effectively proceed even on general cooling condition if sintering temperature is increased to not less than 1400° C.

The filter is not confined to cylindrical form but may be plate in shape. The sufficient thickness of the filter may be normally 15–33 mm.

The filter for metal hot melt in the present invention is obtained by the following processes.

4 to 20 parts by weight of inorganic binders is added to 100 parts by weight of aggregate particles such as alumina, silicon carbide, silicon nitride, zirconia containing not less than 50 wt % of particles whose shape factors are in the range of 100 to 130 after adjustment of the particle size. Furthermore, organic binders such as carboxylmethylcellulose (CMC), ligninsulfonic acid calcium, and dextrin and suitable amount of water are added to the resulting mixture, and subsequently the mixture is kneaded and molded into a predetermined shape. Then, the shaped body thus obtained is dried and sintered under such condition as to generate needle-shaped crystals, whereby a filter of the present invention can be obtained.

DESCRIPTION OF THE PREFERRED EMBODIMENTS

Figure 1:
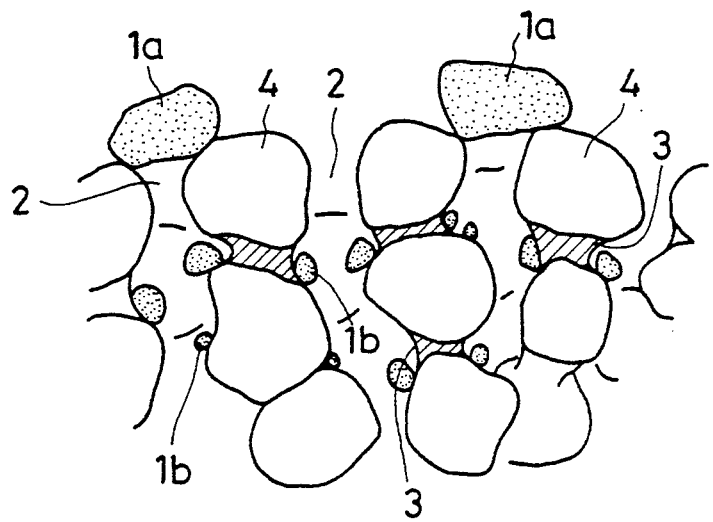
FIG. 1 is an enlarged sectional schematic view of the interior of a filter illustrating the principle of filtering.
Figure 2:
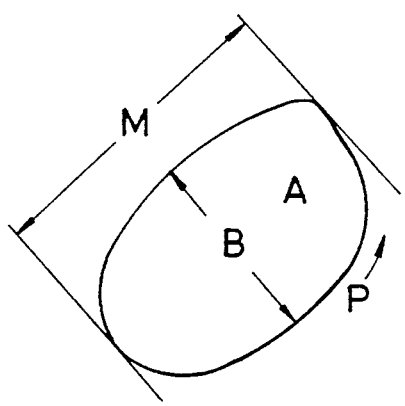
FIG. 2 is a projectional illustration of an aggregate which can be employed for calculating shape factors of the aggregate.

The present invention will be illustrated in further detail hereinafter referring to examples. However, this invention will not be restricted to these examples.

EXAMPLE 1

Cases in Which Needle-Shaped Crystals of Aluminum Borate ($9Al_2O_3.2B_2O_3$) is Generated Sintered alumina which has the 50% average particle diameters, the ranges of the particle size and the shape factors of 105, 130 and 165 as shown in Table 1 was employed as aggregate particles. 12 parts by weight of binders composed of 50wt % of $B_2O_3$, 30wt % of $Al_2O_3$, 15wt % of CaO and 5wt % of MgO were added to 100 parts by weight of the aggregate particles; and the resulting mixture was mixed with organic binders and water. Next, the resultant mixture thus obtained was formed into cylindrical shaped bodies which had 100 mm φ of outer diameter, 60 mm φ of inner diameter and 900 mm of length, followed by drying at 105° C. and then heated to 1350° C. and kept at 1350° C. for 3 hours. Subsequently, the shaped bodies were gradually cooled down until crystallization was completed (specifically, with cooling speed of 50° C./hr to 800° C.), whereby cylindrical filters media were obtained.

If rapid cooling was employed after sintering, using binder of even the same composition as mentioned above, crystals would not be generated on the surface of the binder. Average pore diameters of the filters obtained and the occupying rate of minute pores whose diameters were less than 50% of the average pore diameters were examined.

Through these filters aluminum hot melt having predetermined debris diameters and quantites was passed, and then the debris were measured. Thus debris catching ability of each sample was obtained.

The method of examination of the debris was as follows.

The cross sections of the aluminum were polished precisely and diameters and numbers of debris were measured with a scanning electron microscope (SEM); average values from test pieces were determined from 10 cross section taken. The results are given in Table 1. Nos. 5, 7, 8, 10, 12, 14, 15 are the cases being outside the scope of the present invention.

Table 2 was employed as aggregate particles. 10 parts by weight of binders composed of 72wt % of $Al_2O_3$, 28wt % of $SiO_2$ were added to 100 parts by weight of the aggregate particles; the resulting mixture was then mixed with organic binders and water. Next the resultant mixture thus obtained was formed into plates being 300 mm×300 mm×20 mm with an oil-hydraulic press, followed by drying, and then sintered at 1650° C. Thus filters were obtained. Average pore diameters of the filters obtained and the occupying rate of minute pores whose diameters were less than 50% of the average

TABLE 1

| No. | | 1 | 2 | 3 | 4 | 5 | 6 | 7 | 8 |
|---|---|---|---|---|---|---|---|---|---|
| 1. | Aggregate Particles | | | | | | | | |
| | 50% average particle diam. (μm) | 1000 | 1000 | 1000 | 1000 | 1000 | 1000 | 1000 | 1000 |
| | Particle size range | ±50% | ±50% | ±50% | ±50% | ±50% | ±50% | ±50% | ±50% |
| | Shape factor: 105 | 100 | 100 | 50 | 0 | 0 | 0 | 0 | 0 |
| | Shape factor: 130 | 0 | 0 | 0 | 100 | 100 | 50 | 0 | 0 |
| | Shape factor: 165 | 0 | 0 | 50 | 0 | 0 | 50 | 100 | 100 |
| 2. | Binder: form | crystal | glass | crystal | crystal | glass | crystal | crystal | glass |
| 3. | Result | | | | | | | | |
| | Average pore diam. (μm) | 198 | 200 | 200 | 203 | 205 | 199 | 195 | 198 |
| | Minute pore amt. | 0 | 0 | 2 | 0 | 0 | 5 | 20 | 22 |
| Debris catching ability | | | | | | | | | |
| Debris diam. (μm) | Original amt | | | | | | | | |
| 100< | 10 | 0 | 0 | 0 | 0 | 0 | 0 | 0 | 0 |
| 100~50 | 25 | 0 | 0 | 0 | 0 | 0 | 0 | 0 | 3 |
| 50~10 | 32 | 1 | 5 | 4 | 5 | 5 | 6 | 10 | 20 |
| 10~5 | 35 | 3 | 8 | 6 | 5 | 10 | 7 | 13 | 22 |
| 5~1 | 18 | 3 | 7 | 7 | 10 | 10 | 8 | 10 | 17 |
| 1> | 8 | 2 | 3 | 2 | 3 | 5 | 3 | 5 | 8 |

| No. | | 9 | 10 | 11 | 12 | 13 | 14 | 15 |
|---|---|---|---|---|---|---|---|---|
| 1. | Aggregate Particles | | | | | | | |
| | 50% average particle diam. (μm) | 1000 | 1000 | 710 | 710 | 1400 | 1400 | 1000 |
| | Particle size range | ±30% | ±70% | ±50% | ±50% | ±50% | ±50% | ±70% |
| | Shape factor: 105 | 50 | 50 | 50 | 50 | 50 | 50 | 50 |
| | Shape factor: 130 | 0 | 0 | 0 | 0 | 0 | 0 | 0 |
| | Shape factor: 165 | 50 | 50 | 50 | 50 | 50 | 50 | 50 |
| 2. | Binder: form | crystal | glass | crystal | glass | crystal | glass | crystal |
| 3. | Result | | | | | | | |
| | Average pore diam. (μm) | 200 | 195 | 157 | 163 | 238 | 240 | 195 |
| | Minute pore amt. | 1 | 15 | 3 | 2 | 2 | 2 | 15 |
| Debris catching ability | | | | | | | | |
| Debris diam. (μm) | Original amt | | | | | | | |
| 100< | 10 | 0 | 0 | 0 | 0 | 0 | 0 | 0 |
| 100~50 | 25 | 0 | 0 | 0 | 0 | 1 | 3 | 0 |
| 50~10 | 32 | 2 | 7 | 0 | 0 | 8 | 10 | 5 |
| 10~5 | 35 | 4 | 15 | 1 | 2 | 15 | 15 | 8 |
| 5~1 | 18 | 3 | 10 | 3 | 5 | 6 | 8 | 8 |
| 1> | 8 | 3 | 5 | 2 | 1 | 6 | 7 | 3 |

EXAMPLE 2

Cases in Which Needle-Shape Crystals of Mullite ($3Al_2O_3.2SiO_2$) is Generated Sintered alumina which has the 50% average particle diameters, and the ranges of the particle size as shown in Table 2 was employed as aggregate particles. 10 parts pore diameters were examined. Further, debris catching ability was measured in the same way as Example 1. The results were given in Table 2.

TABLE 2

| No. | | 1 | 2 | 3 | 4 | 5 |
|---|---|---|---|---|---|---|
| 1. | Aggregate particle | | | | | |
| | 50% average particle diam. (μm) | 1000 | 1000 | 1000 | 1000 | 1000 |
| | Particle size range | ±50% | ±50% | ±50% | ±50% | ±50% |
| | Shape factor: 105 | 100 | 50 | 0 | 0 | 0 |
| | Shape factor: 130 | 0 | 0 | 0 | 100 | 50 |
| | Shape factor: 165 | 0 | 50 | 100 | 0 | 50 |
| 2. | Binder: form | crystal | crystal | crystal | crystal | crystal |

TABLE 2-continued

| No. | | 1 | 2 | 3 | 4 | 5 |
| --- | --- | --- | --- | --- | --- | --- |
| 3. Result | | | | | | |
| Average pore diam. (μm) | | 185 | 185 | 190 | 187 | 185 |
| Minute pore amt. | | 0 | 3 | 18 | 1 | 5 |
| Debris catching ability | | | | | | |
| Debris diam. μm | Original amt. | | | | | |
| 100< | 10 | 0 | 0 | 0 | 0 | 0 |
| 100~50 | 25 | 0 | 0 | 0 | 0 | 0 |
| 50~10 | 32 | 2 | 5 | 8 | 7 | 8 |
| 10~5 | 35 | 5 | 6 | 14 | 6 | 10 |
| 5~1 | 18 | 4 | 5 | 7 | 7 | 8 |
| 1> | 8 | 3 | 3 | 6 | 3 | 4 |

EXAMPLE 3

Figure 3:
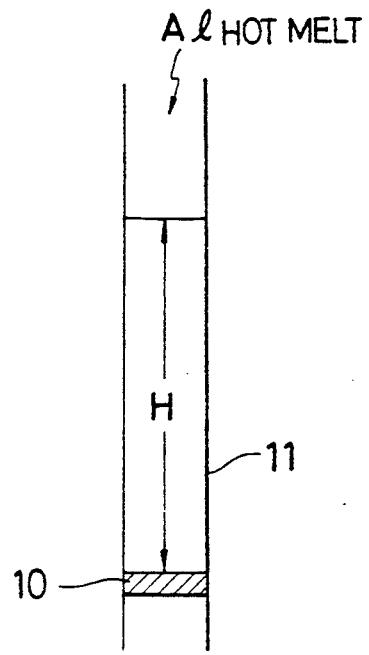
FIG. 3 is an illustration of a testing equipment for measuring initial impregnation of aluminum hot melt.

Some of the filters obtained in Example 1, namely, Nos. 1, 3, 6, 7 in Table 1 were taken and each of them was attached to the equipment 11 shown in FIG. 3. The temperature of the interior of the equipment 11 was kept at 800° C. and Aluminum hot melt (JIS5052) having the temperature of 750° C. was poured therein until predetermined height (H) of the hot melt was attained. The height of the hot melt dropping from the lower surface of the filter 10 within 30 minutes—height of impregnation—was measured in order to evaluate each wettability of the filters and the results were given in Table 3.

TABLE 3

| No. | 1 | 3 | 6 | 7 |
| --- | --- | --- | --- | --- |
| Impregnation height (mm) | 200 | 210 | 220 | 350 |

As is clear from Table 1-3, by using specified aggregate particles and binding materials as in the present invention, it has been found that the ability of a filter to catch minute debris can be improved and the wettability with hot melt was also increased.

What is claimed is:

1. A porous filter comprising:
   aggregate particles; and
   an inorganic binder for binding said aggregate particles;
   wherein said aggregate particles comprise not less than 50 weight % of aggregate particles with a shape factor in the range of 100–130, and said inorganic binder has needle shaped crystals of the binder on the surface thereof, wherein 4–20 parts by weight of said inorganic binder is mixed with 100 parts by weight of said aggregate particles.

2. A porous filter of claim 1, wherein said aggregate particles are selected from the group consisting of alumina, silicon carbide, silicon nitride and zirconia.

3. A porous filter of claim 1, wherein said inorganic binder is selected from the group consisting of mullite, wollastonite, willemite, gahnite and aluminum borate.

4. A porous filter of claim 1, wherein said aggregate particles have a particle size range of ±50% of a diameter which corresponds to 50% weight average diameter of said aggregate particles.

* * * * *